(Model.)

A. E. COOKE.
JOINT FOR TOYS AND OTHER MOVABLE FIGURES.

No. 246,867. Patented Sept. 13, 1881.

Witnesses:
Thos. Kuhn
W. H. Stone.

Inventor.
Alfred E. Cooke

UNITED STATES PATENT OFFICE.

ALFRED E. COOKE, OF PHILADELPHIA, PENNSYLVANIA.

JOINT FOR TOYS AND OTHER MOVABLE FIGURES.

SPECIFICATION forming part of Letters Patent No. 246,867, dated September 13, 1881.

Application filed July 27, 1881. (Model.)

*To all whom it may concern:*

Be it known that I, ALFRED E. COOKE, of the city of Philadelphia, county of Philadelphia, and State of Pennsylvania, have invented a new and useful Improvement in Joints for Toys and other Movable Figures, which improvement is fully set forth in the following specification and accompanying drawings, in which—

Figure 1:
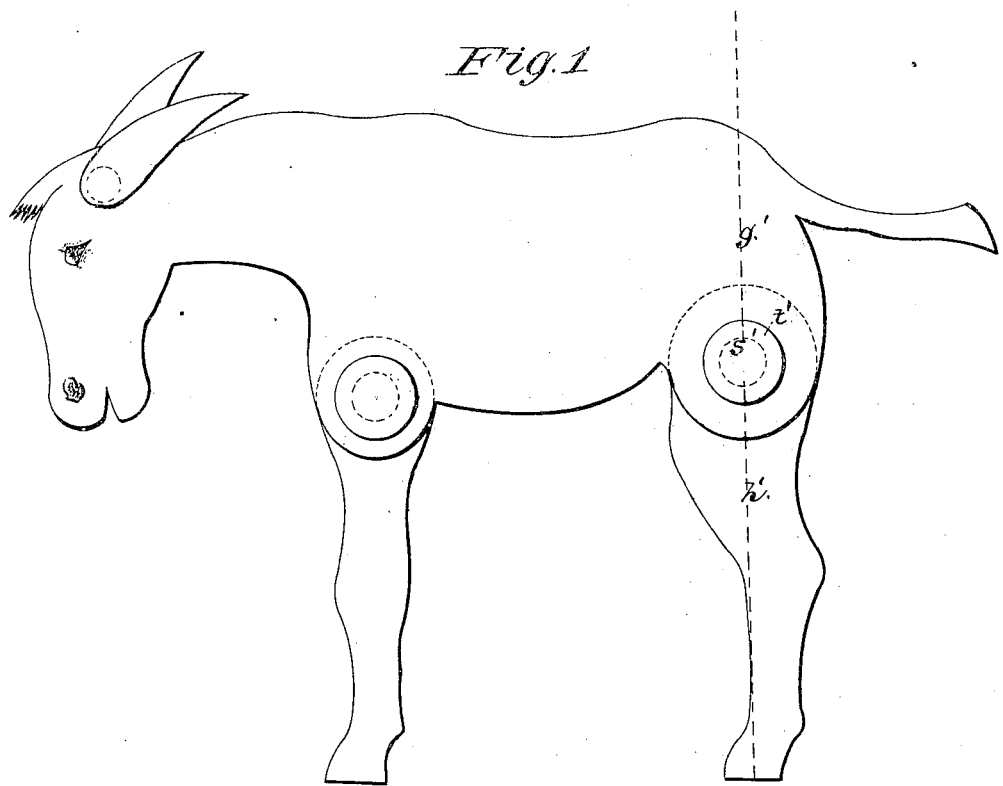
Figure 2:
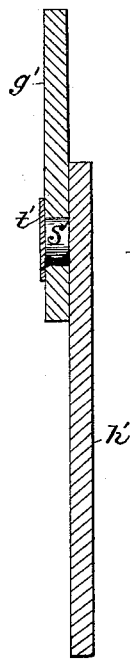

Figure 1 is a side elevation of an animal with my improved joint in the leg and ears; Fig. 2, a vertical section through the hind leg.

The object of my invention is to furnish a cheap joint for toys and other movable figures, made of thin and frail material—such as tissue metal, card-board, and paper—for which this joint is particularly adapted.

In describing the construction of my invention I take leave at the same time to refer to the accompanying drawings, with letters and figures therein.

In the drawings, $g'$ is the side of the animal. $h'$ is the leg. $s'$ is the joint-piece; $t'$, the fixed washer thereof.

To construct my invention I take card-board or other desirable substance and shape the side $g'$, leg $h'$, joint-piece $s'$, and fixed washer $t'$. I then perforate the side $g'$ at the proper places for the joints, of any desired size, thus forming the socket for the joint-piece $s'$ to work in. I then fasten one side of the joint-piece $s'$ with mucilage to one side of the fixed washer $t'$. When the mucilage is dry I then insert the joint-piece $s'$ into the socket provided for it in the side $g'$. I then apply mucilage to the exposed side of the joint-piece $s'$, and therewith fasten the leg $h'$ to it, taking care that the mucilage does not spread and fasten any other part. Thus the joint is completed.

Having thus described my invention, what I claim as new, and desire to secure by Letters Patent, is—

1. The socket and joint-piece $s'$, with the fixed washer $t'$, when arranged and fastened to a toy or other movable figure in the manner as and for the purpose set forth.

2. The combination of the fixed washer $t'$ and the joint-piece $s'$ with the parts $g'$ and $h'$, all substantially as shown and described.

ALFRED E. COOKE.

Witnesses:
ORMI ROGERS,
W. C. R. REED.